(12) United States Patent
Barton

(10) Patent No.: US 9,068,866 B2
(45) Date of Patent: Jun. 30, 2015

(54) MICROMONITORING APPARATUS AND METHOD

(71) Applicant: STANTEC TECHNOLOGY INTERNATIONAL, INC., Edmonton (CA)

(72) Inventor: John Michael Hamden Barton, Cincinnati, OH (US)

(73) Assignee: STANTEC TECHNOLOGY INTERNATIONAL, INC., Edmonton, Alberta (CA)

( * ) Notice: Subject to any disclaimer, the term of this patent is extended or adjusted under 35 U.S.C. 154(b) by 0 days.

(21) Appl. No.: 14/513,358

(22) Filed: Oct. 14, 2014

(65) Prior Publication Data

US 2015/0027222 A1    Jan. 29, 2015

Related U.S. Application Data

(62) Division of application No. 13/534,106, filed on Jun. 27, 2012, now Pat. No. 8,857,256.

(51) Int. Cl.
| | | |
|---|---|---|
| *G01F 1/20* | (2006.01) | |
| *G01F 1/00* | (2006.01) | |
| *G01F 1/66* | (2006.01) | |

(52) U.S. Cl.
CPC *G01F 1/20* (2013.01); *G01F 1/002* (2013.01); *G01F 1/663* (2013.01); *E03F 2201/20* (2013.01)

(58) Field of Classification Search
CPC ........... G01F 1/002; G01F 1/20; G01F 1/663; E03F 2201/20
USPC .................................................. 73/215–227
See application file for complete search history.

(56) References Cited

U.S. PATENT DOCUMENTS

| | | | | |
|---|---|---|---|---|
| 1,418,032 | A * | 5/1922 | Stevens | 73/216 |
| 4,095,466 | A * | 6/1978 | Schontzler et al. | 73/215 |
| 4,127,032 | A * | 11/1978 | Martig, Jr. | 73/215 |
| 4,195,520 | A * | 4/1980 | Shaver | 73/215 |
| 4,799,388 | A * | 1/1989 | Hunter | 73/861.63 |
| 4,896,542 | A * | 1/1990 | Hunter | 73/861.63 |
| 5,608,171 | A * | 3/1997 | Hunter et al. | 73/861.63 |
| RE35,503 | E * | 5/1997 | Hunter | 73/861.63 |
| 5,852,240 | A * | 12/1998 | LeBlanc | 73/215 |
| 2002/0071721 | A1* | 6/2002 | Gearhart | 405/37 |
| 2002/0170350 | A1* | 11/2002 | Schutzbach | 73/195 |
| 2003/0216873 | A1* | 11/2003 | Schutzbach | 702/50 |
| 2003/0234218 | A1* | 12/2003 | Yang | 210/614 |
| 2009/0105969 | A1* | 4/2009 | Saylor | 702/47 |
| 2010/0326906 | A1* | 12/2010 | Barnes | 210/614 |
| 2011/0045165 | A1* | 2/2011 | Rigby | 427/8 |

* cited by examiner

*Primary Examiner* — Lisa Caputo
*Assistant Examiner* — Philip Cotey
(74) *Attorney, Agent, or Firm* — Finch & Maloney PLLC

(57) ABSTRACT

An apparatus and method for monitoring sanitary sewer systems designed to carry away wastewater through a system of buried pipes, often referred to as "sewer lines", to a sewage treatment facility, the apparatus and method use a weir which facilitates the collection of flow rate data in the sewer lines which in turn facilitates the determination of infiltration and inflow ("I/I") of rain water, or clear water, into the sewer system in a manner which further allows the identification of specific I/I locations so that repair and construction of sewer systems can be efficiently coordinated.

17 Claims, 11 Drawing Sheets

Chart of Flow Rate Over Time at MM-03

Chart of Flow Rate Over Time at MM-06

MICROMONITORING APPARATUS AND METHOD

CROSS-REFERENCE TO RELATED APPLICATIONS

This application is a divisional of co-pending U.S. patent application Ser. No. 13/534,106, filed Jun. 27, 2012.

FIELD OF THE INVENTION

The present invention relates to an apparatus and method for monitoring sanitary sewer systems designed to carry away wastewater through a system of buried pipes to a sewage treatment facility. More particularly the apparatus and method use a weir which facilitates the collection of flow rate data in the sewer lines which in turn facilitates the determination of infiltration and inflow ("I/I") of rain water, or clear water, into the sewer system in a manner which additionally allows the identification of specific I/I locations so that repair and construction of sewer systems can be efficiently coordinated.

BACKGROUND OF THE INVENTION

Sanitary sewer systems are generally designed to carry away wastewater from sinks, dishwashers, showers, and toilets from homes or businesses through a system of buried pipes, often referred to as "sewer lines", to a sewage treatment facility. Such sewer systems are generally separate from storm drains and catch basins used for collecting rain water or "clear" water runoff. Infiltration and inflow ("I/I") of rain water or clear water, terms used to distinguish it from wastewater, (although clear water may be dirty), to sewer systems increases the load on sanitary sewer systems. Clear water typically is collected and directed via storm drains, culverts, drainage ditches, or across ground surfaces, but generally not in sanitary sewers. When clear water enters sanitary sewer systems, it must be transported and treated like sanitary waste water which increases the load and thus the cost associated with sanitary sewage systems and treatment. During dry weather, the amount and impact of I/I varies based on the circumstances. During wet weather, the impact of I/I is typically increased as the precipitation makes its way into the ground and often into sewage systems. As a rain or snow melt event occurs, I/I sources can start filling the sanitary sewer systems with clear water, and can eventually fill the sewer systems to capacity.

Inflow and infiltration are generally understood to mean two different things. Inflow is a direct connection or communication of clear water to a sewer system. Various sources contribute to inflow, including footing/foundation drains, roof drains or leaders, downspouts, drains from window wells, outdoor basement stairwells, drains from driveways, groundwater/basement sump pumps, and even streams. These sources are typically improperly connected to sanitary sewer systems, either directly or indirectly through wastewater drains. An improper connection allows water from sources other than the appropriate wastewater sources to enter the sanitary sewer system. This clear water should be entering storm water systems or be allowed to soak into the ground, instead of entering the sanitary sewer system.

Infiltration on the other hand occurs through cracks and/or leaks in the sanitary sewer pipes or manholes. Cracks or leaks may be caused by age related deterioration, loose joints, poor design, installation or maintenance errors, damage, or root infiltration. Groundwater enters these cracks or leaks whenever the soil above or surrounding sewer systems becomes saturated due to precipitation or nearby bodies of water. Often sewer pipes are installed beneath creeks or streams because they are the lowest point in the area and it is more expensive to install the pipe systems beneath a roadway. These sewer pipes are especially susceptible to infiltration when they crack or break and have been known to drain entire streams into sanitary sewer systems.

There are significant concerns that go hand-in-hand with I/I. Added clear water within sewer systems reduces the ability of those systems to operate properly. It increases the overall amount of wastewater in pipes as it combines with the waste that has properly drained into the sewers. This in turn increases the amount of wastewater that ends up at treatment facilities, thereby affecting the facilities' ability to properly transport, treat, and manage the end product. As a result of I/I, wastewater treatment processes are compounded and poorly treated wastewater may be discharged to the environment.

Problems can also occur before the wastewater arrives at the treatment facility. If sanitary sewer systems reach capacity or become overloaded, wastewater may flow backward through the sanitary sewer pipe, which can cause floods of basements or households and also cause manholes to pop open releasing wastewater onto the street. Overflow occurrences put public health at risk and violate state and federal environmental regulations. Overflows can release wastewater into waterways, onto streets, and even into basements, resulting in serious health risks. As wastewater overflows into creeks, rivers, lakes, and streams it contaminates all bodies of water downstream and affects all of the creatures and plants that come in contact with the polluted water.

There are various costs resulting from the effects of I/I, including the greater load to the sewer system pipes, sewer system overflows, and extra wastewater at treatment facilities. Accordingly, municipalities and sanitary sewer authorities have a financial interest in reducing I/I through repair or replacement of the sewage pipes. However, wastewater infrastructure maintenance is very costly, which has increased the interest in devices and methods for measuring I/I related flow in order to pinpoint the problematic sources.

There are multiple devices and methods that measure flow within sewer systems. Many of the available methods make use of a primary flow restricting device in conjunction with a sensing probe (generally an area-velocity meter or ultrasonic level detector). Examples of primary devices include the Parshall Flume, the Palmer-Bowlus flume, the Thelmar weir, and the inline weir. The purpose behind using a primary device is to be able to measure the flow rate from a single measurement—depth (also known as the level within the pipe as measured by the area-velocity meter). Depth is converted to flow from a rating curve established for the specific device and conditions. Depth is a fairly robust measurement, and very easy to confirm with alternative measurements such as a tape measure. The goal of each of these devices is to operate as a primary device over as wide a range as possible. In order to achieve that goal, the primary devices obstruct the flow of wastewater within the sewer systems to create a slow moving pool of water. measurable depth. In general the greater the obstruction to flow, the wider the range to which the rating curve will apply.

However, the current techniques that utilize these primary devices, as well as other methods that currently measure wastewater flow, have drawbacks. One drawback is that the devices used typically are not surface insertable, adding to the cost, labor, and limitations involved. Another drawback is that the current area-velocity meters have difficulty measuring very low flow, which places a size limitation on the precipitation events available for the corresponding methods.

A further drawback relates to the obstructions that current primary devices create in order to widen the range of measurable depth. This not only poses the risk of clogging up the sewage system, but also results in increased costs due to the inefficiencies of having to monitor these devices. For example, extremely obstructive devices, such as the Thelmar weir, are typically only used for a few hours and then removed to reduce the risk of obstruction. Devices less subject to clogging, like a Palmer-Bowlus flume, create deep flow upstream which results in a very slow flow, allowing solids to deposit upstream and become anaerobic. Some methods even require extended on-sight evaluations by consultants, which further increases costs.

Thus, there is a need for an accurate, efficient, and cost-effective method and device for measuring wastewater flow in sanitary sewer systems in order to pinpoint I/I sources.

OBJECT AND SUMMARY OF THE INVENTION

Wherefore, it is an object of the present invention to overcome the aforementioned problems and drawbacks associated with currently known inflow and infiltration (I/I) source detection devices and methods. The invention relates to a micromonitoring device and method that measures, records, and/or evaluates the flow characteristics of wastewater in sanitary sewer systems to help identify sources of infiltration and inflow ("I/I"). Related to the present invention, the term "micromonitoring" refers to being able to measure low flow rates within a piping system.

One aspect of the invention is a micromonitoring device that accurately measures very low flow rates of fluids, as well as high flows, allowing data to be gathered for a wider range of fluid flows in a cost-effective manner.

The micromonitoring device is surface insertable which allows the invention to be easily installed without having to enter the pipe system that the device is measuring. This further contributes to the cost savings and efficiency associated with using the micromonitoring device.

In another aspect of the invention, a micromonitoring weir having a short central radial height and a substantially zero-slope leading edge is used with the micromonitoring device to reduce the obstruction needed to measure the flow of fluids within a piping system. The use of the micromonitoring weir allows solids and semi-solids contained in wastewater to easily move past it to prevent build-ups upstream of the device. This results in the ability to leave the micromonitoring device in sewer pipes for long periods of time without having to monitor the effects of the device's obstruction.

In another aspect of the invention, a micromonitoring method inserts at least one micromonitoring device in sewage pipes for at least one precipitation event in order to measure the flow of wastewater. The flow measurements during the at least one precipitation event helps indicate whether there is I/I upstream of the measured location. The flow increase measured during, or shortly after, the precipitation event is proportional to the amount of I/I upstream.

The micromonitoring method is iterative, such that the process of measuring flow(s) at a first location(s) and moving upstream to a second location(s) chosen based on the information gathered can be repeated until the desired level of I/I pinpointing has been achieved. Each iteration results in cost and resource savings to the actual fixing of the I/I problems.

Another aspect of the invention is to use secondary identification methods to help pinpoint I/I sources after narrowing down I/I locations using the micromonitoring method. Secondary identification methods make use of visual inspections, closed circuit television ("CCTV"), smoke and dye testing, as well as other techniques known in the field to further help pinpoint I/I sources. Secondary identification methods could be used after narrowing down what pipes or pipe areas are problematic. Secondary identification methods would be placed into the problematic areas in order look at the actual I/I sources to provide additional information related to what is causing the I/I.

The present invention relates to a micromonitoring apparatus for measuring the flow of wastewater within a sewer system, comprising a supportive band, a sensing probe attached to the band for measuring wastewater characteristics, a weir attached to the supportive band; and wherein the weir has a substantially zero slope leading edge and a short central radial height that creates an obstruction to the wastewater.

The present invention also relates to a method of identifying inflow and infiltration in a sewage system, comprising the steps of inserting a micromonitoring apparatus into a sewer pipe at a measuring location, the micromonitoring apparatus comprising a supportive band, a sensing probe attached to the band for measuring wastewater characteristics, a weir attached to the supportive band, and wherein the weir has a substantially zero slope leading edge and a short central radial height that creates an obstruction to the wastewater, measuring characteristics of wastewater within the sewer pipe for at least one precipitation event; and recording the measurements of the wastewater characteristics.

These and other features, advantages and improvements according to this invention will be better understood by reference to the following detailed description and accompanying drawings.

BRIEF DESCRIPTION OF THE DRAWINGS

The invention will now be described, by way of example, with reference to the accompanying drawings in which.

DETAILED DESCRIPTION OF THE INVENTION

Figure 1:
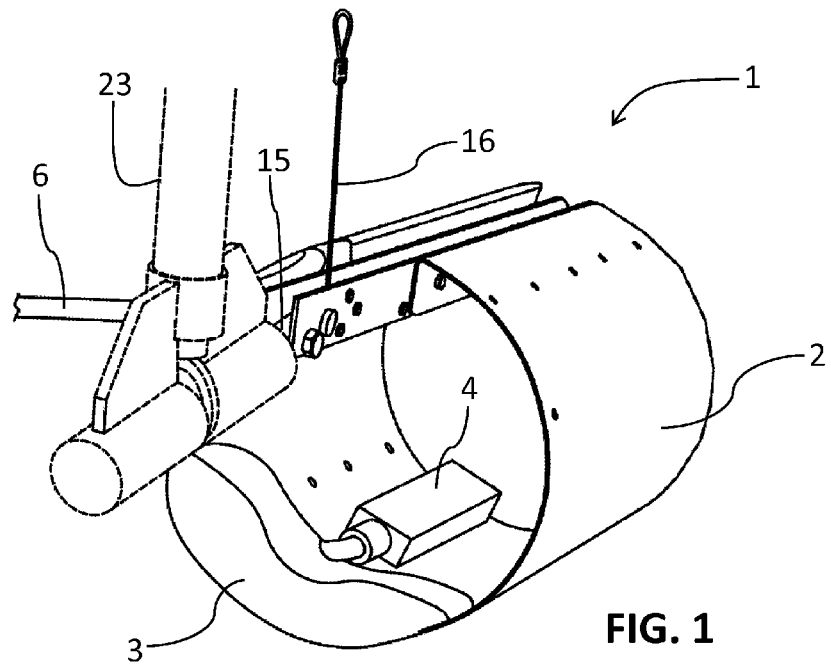
FIG. 1 is a perspective view of one embodiment of a micromonitoring device according to one aspect of the present invention.
Figure 2:
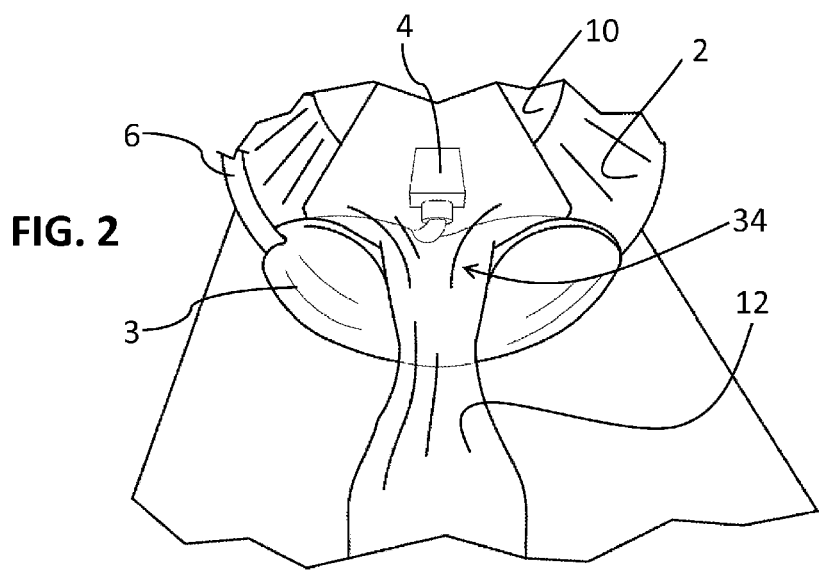
FIG. 2 is a downstream view of the bottom half of the micromonitoring device shown in FIG. 1 installed in a sewer pipe.
Figure 3:
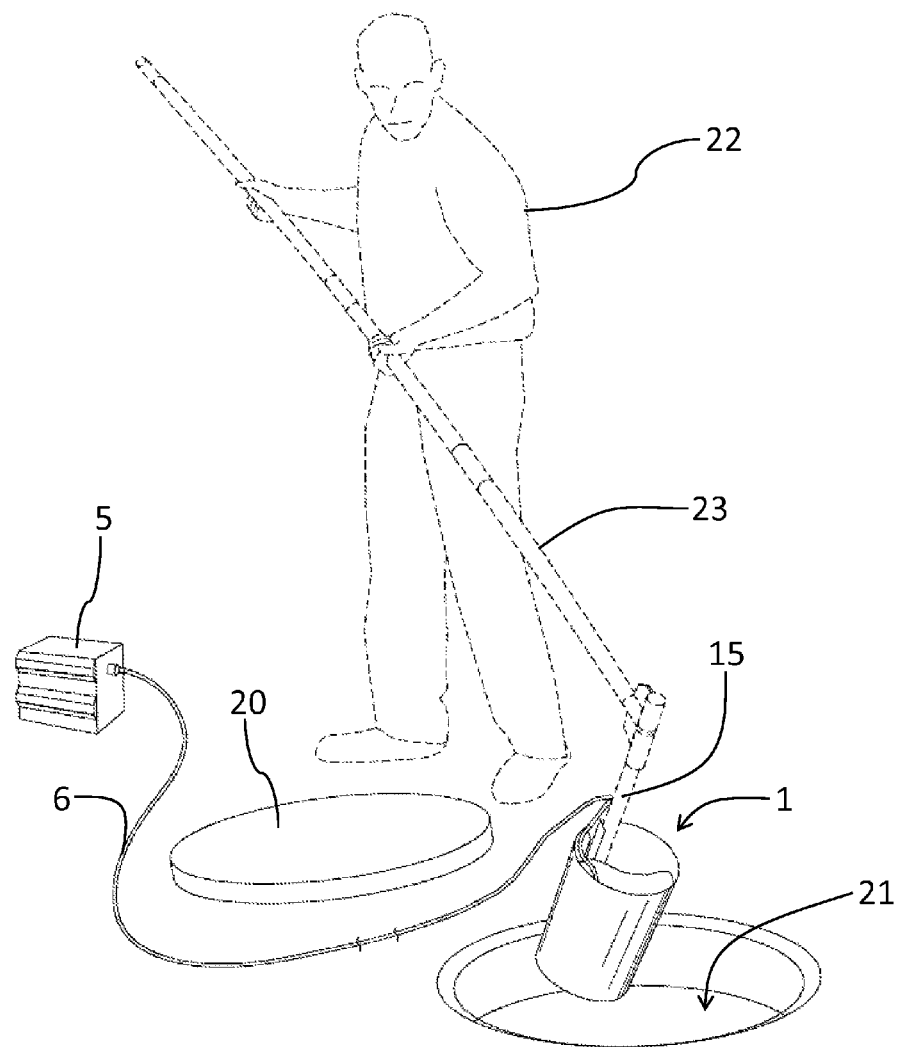
FIG. 3 is a view of the micromonitoring device shown in FIG. 1 being inserted into a manhole to install the device as shown in FIG. 2.

Turning initially to FIGS. 1-3, one aspect of the present invention relates to a micromonitoring device 1. In this specific embodiment, the micromonitoring device 1 measures and records the flow of wastewater 12 with a sanitary sewer system; however, the micromonitoring device 1 could be used to measure and record liquid or semi-liquid flow within other pipe systems. The micromonitoring device 1 is comprised of a supportive band 2, a micromonitoring weir 3, a sensing probe 4, and a data logger 5 connected to the sensing probe 4 by a cable 6. Generally, the supportive band 2 provides a supportive frame to attach components and allow easily installation within pipes, the micromonitoring weir 3 obstructs the flow of wastewater 12 within the pipe in order to provide an operating depth to the sensing probe 4, the sensing probe 4 measures the depth (also known as the level within the pipe) and velocity of the wastewater 12, and the cable 6 allows the sensing probe to communicate with the data logger 5, which records the flow measurements.

As shown in FIGS. 1 and 2, the supportive band 2 has a cylindrical shape to correspondingly fit within a sewer pipe 10 in order to measure and record the flow of liquid in the pipe. The pipe 10 as shown has a diameter of 20.32 cm (8 inches), which is typical of the size of most sewer pipes in the U.S. However, the supportive band 2 and micromonitoring weir 3 can be selected or adjusted to accommodate pipes of different diameters.

The supportive band 2 could be made of any material that is water resistant and will maintain its shape within the pipe, but also flexes enough to aid installation. In the current embodiment shown in FIGS. 1-3, the supportive band 2 is made of stainless steel; however, other materials could be used for the supportive band, such as other metals like aluminum or various synthetic polymers like PVC. An example of a supportive band that can be used for the micromonitoring device 1 is sold by Teledyne Isco®.

As shown in FIG. 1, the micromonitoring weir 3 and sensing probe 4 are attached to the supportive band 2 before insertion into the sewer pipe 10. In this embodiment the micromonitoring weir 3 and sensing probe 4 are attached to the supportive band 2 using bolts; however, they could be attached in some other manner, such as by a water resistant adhesive. As can be appreciated by FIG. 2, the sensing probe 4 (generally an area-velocity probe) is attached to the supportive band 2 upstream from the micromonitoring weir 3. The micromonitoring weir 3 and sensing probe 4 can be attached either partially or entirely to the supportive band 2.

A cable 6 runs from the sensing probe 4 to a data logger 5 to communicate the measurements from the sensing probe 4 to the data logger 5. The sensing probe 4 has at least the ability to measure the wastewater's 12 depth and velocity. The data logger 5 can have the ability to perform any or all of the following: store the measurements, transmit the measurements, or perform calculations or conversions using the measurements. The sensing probe 4 and data logger 5 are typically battery-powered, although they could also be powered using solar energy or other forms of electricity.

An example of a sensing probe 4 and data logger 5 combination that can be used for the micromonitoring device 1 is sold by Teledyne Isco®, specifically their ISCO 2150 Area Velocity Module. Although the embodiment shown in FIGS. 1-3 utilizes a sensing probe 4 that is separate from the data logger 5, requiring a connecting cable 6 to communicate, these two components could be combined into one integrated component that performs all of the tasks that the two individual components perform.

The micromonitoring device 1 is surface insertable, meaning that it can be installed without the installer 22 needing to climb down into a manhole 21. FIG. 3 shows one embodiment of the micromonitoring device 1 being installed, where the installer 22 uses an installation tool 23 that attaches to a protrusion near the top of the supportive band 2 in order to insert the micromonitoring device 1 into the sewer pipe 10. As depicted, the end of the installation tool 23 slides onto the installation member 15 and the installation strap 16 is pulled tight to allow the installer 22 to lower the micromonitoring device into the manhole. Pulling the installation strap 16 tight also collapses the supportive band 2 so that it can be inserted into the sewer pipe 10. Once inserted, the strap is released so that the supportive band 2 can expand in order to secure the micromonitoring device 1 in the sewer pipe 10.

After the micromonitoring device 1 is installed, the installation tool 23 is removed. The micromonitoring device 1 can then be left in the sewer pipe 10 for as long as desired for the reasons explained below. An example of an installation tool that can be used for the micromonitoring device 1 is sold by Teledyne Isco®, specifically their Multi-Section Pole. This installation tool provides just one example of a method of installing the micromonitoring device 1 from the surface. Because the micromonitoring device 1 is surface insertable and only requires one person for installation, using the micromonitoring device 1 results in significant cost and time savings. The installer 22 can quickly and easily insert the micromonitoring device 1 without physically entering the manhole 21 or needing to enter the sewer system whatsoever, which additionally promotes safety and health, as well as convenience.

Figure 4:
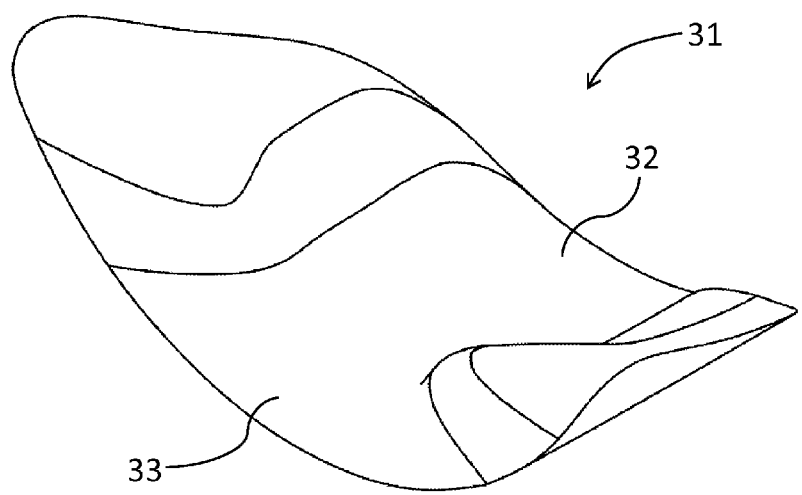
FIG. 4 is a perspective view of one embodiment of a micromonitoring weir according to one aspect of the present invention.
Figure 5:
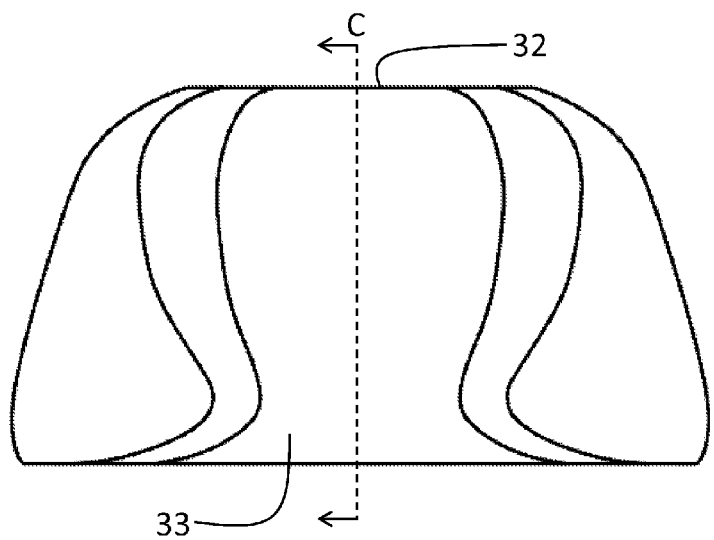
FIG. 5 is a top view of the micromonitoring weir shown in FIG. 4.

Turning to another aspect of the present invention, one embodiment of the micromonitoring weir 3 is shown in FIGS. 4-8. The micromonitoring weir 3 design depicted is shown to provide one embodiment of the present invention, but the specific embodiment shown and described here should not be construed to be limiting. As shown in FIGS. 4-5, the micromonitoring weir 3 has a leading edge 32 and a trailing edge 33, where the leading edge 32 faces upstream and the trailing edge 33 faces downstream in the micromonitoring device 1. A flow channel 34 is generally in the center of the top of the micromonitoring weir 3 to assist the flow of wastewater 12 past the micromonitoring weir 3.

The micromonitoring weir 3 can be made from any material that will maintain a solid state and preferably not deteriorate if left in a sewer pipe over long periods of time. This includes various polymers, metals, ceramics, woods, stones, and composites. Further, the micromonitoring weir 3 can be made from many different manufacturing processes, such as various forms of casting, molding or cutting.

Figure 6:
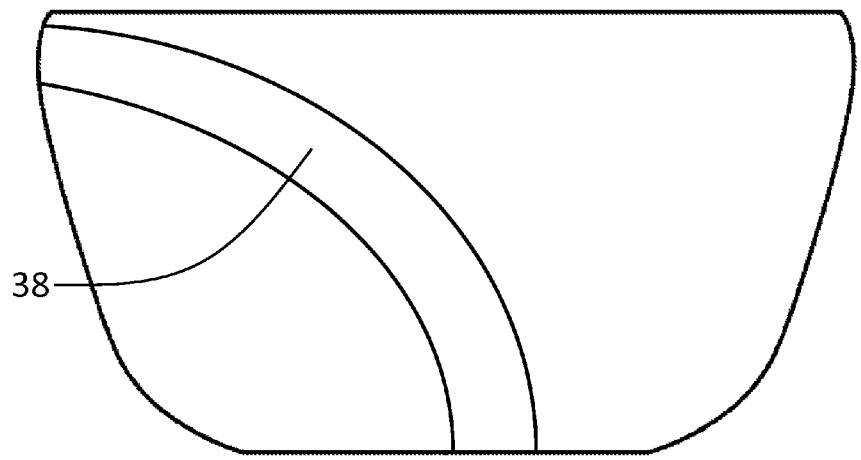
FIG. 6 is a bottom view of the micromonitoring weir shown in FIG. 4.

As shown in FIG. 6, the bottom of the present embodiment of the micromonitoring weir 3 has a cutout 38 to accommodate the cable 6 that connects the sensing probe 4 to the data logger 5, although a cutout 38 is not always necessary. The micromonitoring weir 3 may also have threaded bolt holes or other various bores depending on how the micromonitoring weir 3 is attached to the supportive band 2.

Figure 7:
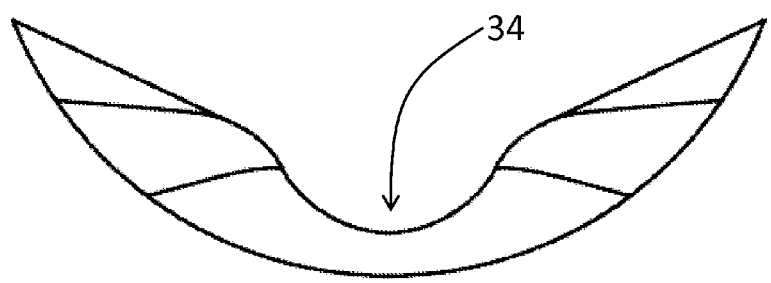
FIG. 7 is an end view of the micromonitoring weir shown in FIG. 4.

Turning to FIG. 7, the central radial height 35 of the micromonitoring weir 3 is generally very small, and typically less than one-tenth of the diameter 11 of the sewer pipe 10. The central radial height 35 is measured at the center of the flow channel 34. This height 35 helps dictate the minimum depth of wastewater that is maintained around the sensing probe 4. In the present embodiment, the sewer pipe 10 has a 20.32 cm (8 inch) diameter and the central radial height 35 of the micromonitoring weir 3 is in the range of 1.25 cm (0.5 inches) to 3.80 cm (1.5 inches), and more specifically 1.66 cm (0.655 inches).

Figure 8:
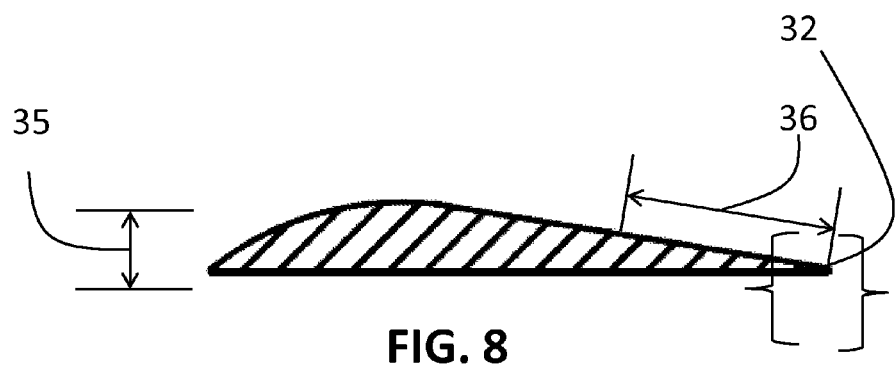
FIG. 8-8A is a cross-sectional view of the micromonitoring weir shown in FIG. 4 along the line C shown in FIG. 5 with an inset of the zero slope leading edge.
Figure 8A:
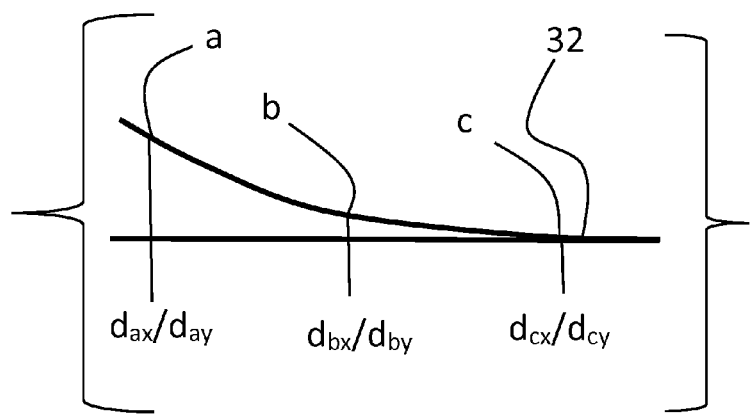

The cross-sectional view in FIG. 8 is along the line C in FIG. 5. This view shows that the leading edge 32 of the micromonitoring weir 3 has a slope 36 as close to 0 degrees as possible within manufacturing tolerances. The slope diminishes as shown in FIG. 8A from a first point a having a greater slope to a midpoint b having a lesser slope, to a final point c that has a slope approaching zero and forming the leading edge 32 of the micromonitoring weir 3. The zero slope leading edge 32 of the micromonitoring weir 3 allows solids and semi-solids within the wastewater to flow around or above the sensing probe 4 and be lifted over the micromonitoring weir 3. The aerodynamic shape of the micromonitoring weir 3 and smooth flow lines created by the zero slope leading edge 32 allow for a steady flow of the wastewater 12.

As is generally known in the field, low flow within sewer systems is difficult to measure without use of a primary device. This is due to the depth of the wastewater not being sufficient for sensing probes to measure velocity. Examples of known primary devices include the Parshall flume, the Palmer-Bowlus flume, the Thelmar weir, and the inline weir, among others. Thus, primary devices create sufficient obstructions in order to reduce approach velocity to nearly zero and maintain a certain depth around the sensing probes. The depth is measured and converted to flow rate from a rating curve that is specific to the primary device's design and conditions. Depth is used because it is a fairly robust measurement and can be easily confirmed using alternative methods. The typical goal of most previous primary devices is to operate as a primary device over as wide a range as possible. In general, the greater the obstruction to wastewater flow caused by the primary device the wider the range that the rating curve will apply.

Figure 9A:
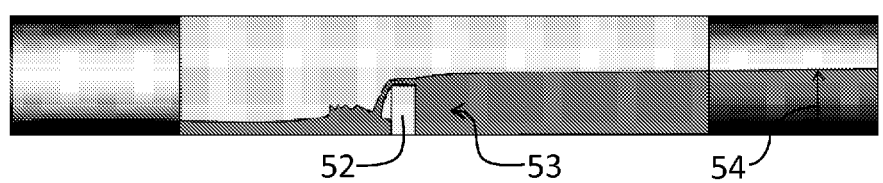
FIGS. 9A-9C are graphical representations comparing cross-sectional views of sewer pipes containing an inline weir and Palmer-Bowlus flume of the prior art, to one embodiment of the micromonitoring weir of the present invention.
Figure 9B:
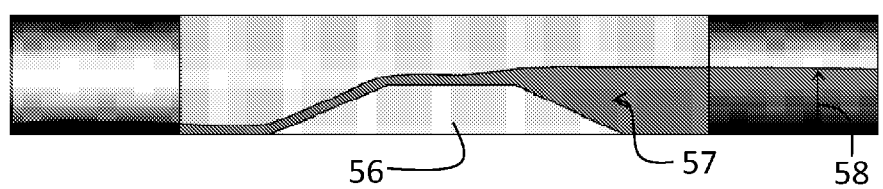
Figure 9C:
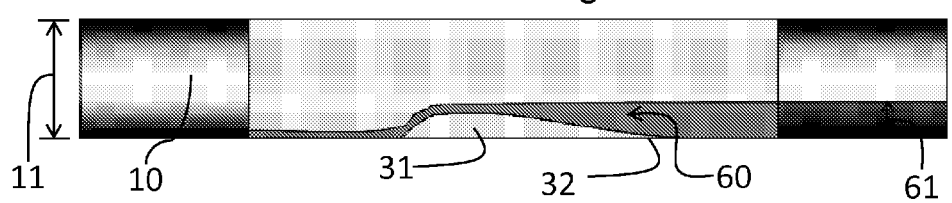

FIGS. 9A-9C show a graphic of the obstruction caused by the micromonitoring weir 3 as compared to the obstructions caused by two other primary devices known in the field—an inline weir 52 and a Palmer-Bowlus flume 56. The inline weir graphic 51 shows that the inline weir 52 creates a substantial obstruction 53 at the bottom portion of the sewer pipe, which creates a deep upstream depth of wastewater 54. The Palmer-Bowlus flume graphic 55 similarly shows that the Palmer-Bowlus flume 56 creates a substantial obstruction 57 at the bottom portion of the sewer pipe, which creates a deep upstream depth of wastewater 58.

The substantial obstructions 53, 57 caused by these two primary devices 52, 56 provide a wide range for their respective rating curves to apply. However, the shape and height of these two primary devices 52, 56 and other primary devices currently known in the art make it difficult for solids and semi-solids within the wastewater to flow past the device. The necessary substantial obstructions 53, 57 created greatly increase the likelihood of debris accumulation in the bottom of the pipe, which can cause significant deposition of solids upstream from these primary devices. This in turn typically results in anaerobic conditions where the flow stops entirely due to the buildup of debris, known as clogging or ragging (the term used in the flow monitoring field) with the sewer system.

The micromonitoring weir graphic 59 in FIG. 9C shows that the small central radial height 35 creates a very shallow upstream obstruction 60, which in turn creates a shallow upstream depth 61. The design of the micromonitoring weir 3 is selected to ensure that the central radial height 35 is large enough to create an upstream obstruction deep enough to allow the sensing probe 4 to be sufficiently submerged to make accurate readings, but small enough to create a shallow upstream obstruction. After the sensing probe 4 measures the wastewater depth, conversions to flow velocity are either made in the data logger 5 or after the depth measurements are retrieved from the data logger 5. As a result, the micromonitoring device 1 is able to accurately measure and record the flow velocity of low flow of wastewater 12.

The shallow obstruction 60 caused by the micromonitoring weir 3 and its zero slope leading edge 32 prevent clogging or ragging within the sewer system. Clogging, or ragging, is prevented due to the ability of solids and semi-solids within wastewater to flow past the micromonitoring weir 3, and thus past the entire micromonitoring device 1, as they flow downstream. As a result, the micromonitoring device 1 can be left in sewer pipes for as long as desired, in contrast to other measuring devices which utilize primary devices known in the field. Therefore, use of the micromonitoring device 1 results in significant cost and efficiency benefits, because the micromonitoring device 1 can be installed at any time, does not have to be monitored, and can be removed at any time.

Figure 10:
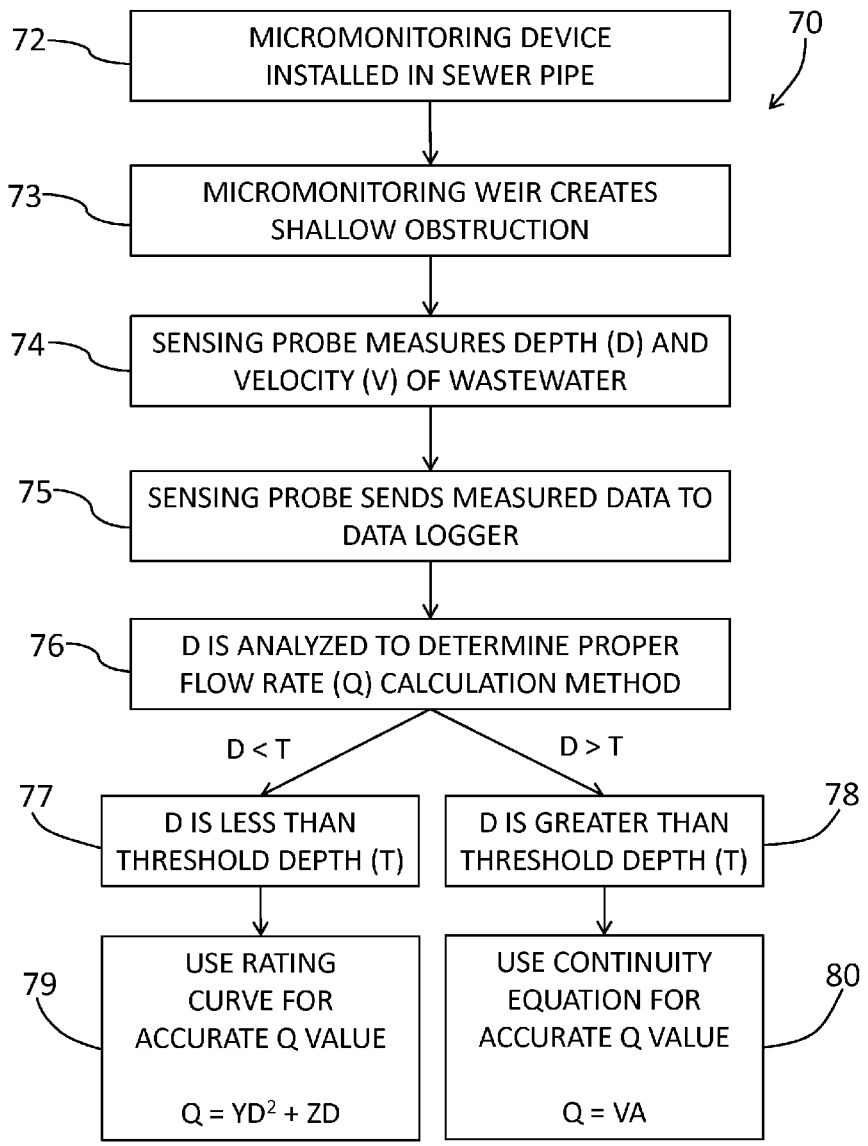
FIG. 10 is a schematic block diagram illustrating one embodiment of calculating flow rate using the micromonitoring device shown in FIG. 1.

The following description of a micromonitor is for relatively flat sloped sewer pipes. The accuracy of the micromonitor for steeply sloped sewer pipes may be different. FIG. 10 illustrates the way that the micromonitoring device 1 calculates the flow rate Q of wastewater in sewer pipes 71. First, the micromonitoring device 1 is installed in a sewer pipe 72. Once installed the micromonitoring weir 3 obstructs the flow of wastewater 73 until there is a shallow obstruction 60 created which sufficiently covers the sensing probe 4 with wastewater. This ensures that depth is accurately recorded by the sensing probe 4. Due to the small central radial height 35 of the micromonitoring weir 3 resulting in a shallow obstruction 60, the micromonitoring device 1 uses two different methods to accurately calculate the flow rate Q of wastewater—the first calculation utilizes the micromonitoring weir's 3 rating curve 79 and the second calculation utilizes a continuity equation 80.

The sensing probe 4 measures at least the depth and velocity of the wastewater once inserted; however, during low flow, the velocity is not accurately measured, thus the use of a primary device, in this case the micromonitoring weir 3, allows the micromonitoring device to calculate low flows in relatively low sloped sewer pipes using the specific rating curve for the weir's design. The primary device rating curves listed below are only applicable in relatively flat sewer pipe 10 with a relatively low slope. It is preferential to establish a threshold depth T that dictates which calculation method to use for accurately calculating Q. The threshold depth T depends on a number of certain factors, such as the design of the micromonitoring weir 3, the specifications of the sensing probe 4, and/or the size of the pipe being monitored; however, the specific factors that typically dictate the range for the threshold depth T include the depth range that the rating curve of the micromonitoring weir 3 accurately operates and the minimum velocity required for the sensing probe to accurately measure wastewater velocity.

Once the threshold depth T is decided, the measured depth D dictates the appropriate calculation 79, 80 to use. When the measured depth is below the threshold depth 77, the more preferred method of calculating the flow rate Q is to use the rating curve 79 associated with the micromonitoring weir 3. When the measured depth is above the threshold depth 78, the more preferred method of calculating the flow rate Q is to use the continuity equation 80. However, the rating curve and continuity equation calculations have an overlapping range where both equations accurately calculate flow rate Q, thus T could be selected from any value within that overlapping range.

A general rating curve calculation 79 may use the equation $Q=YD^2+ZD$, where Q is flow rate, D is depth, and Y and Z are coefficients determined by the design of the specific weir. By way of example, the micromonitoring weir 3 operates as a primary device generally in the range of 0 gallons per minute ("gpm") to 25 gpm. A general continuity equation calculation 80 uses the equation $Q=VA$, where Q is flow rate, V is velocity, and A is cross-sectional area (which is calculated from the measured depth D and the shape of the sewer pipe). By way of example, the specific sensing probe 4 from the ISCO 2150 Area Velocity Module accurately measures the wastewater velocity V above about 10 gpm.

Below are the rating curve data points of flow rate (in millions gallons/day) in relation to wastewater depth (in inches) for one embodiment of the present micromonitoring weir invention. It is to be kept in mind that the first 7-8 data points at the top represent an estimate for the leakage around the band:

| Depth of Flow (Inches) | Flow Rate (Millions Gallons/Day) |
| --- | --- |
| 0 | 0 |
| 0.1 | 0.0001 |
| 0.2 | 0.0002 |
| 0.3 | 0.0003 |
| 0.4 | 0.0004 |
| 0.5 | 0.0005 |
| 0.6 | 0.0006 |
| 0.7 | 0.0007 |
| 0.8 | 0.0008 |
| 0.9 | 0.001 |
| 1 | 0.0013 |
| 1.1 | 0.0016 |
| 1.2 | 0.0021 |
| 1.3 | 0.0027 |
| 1.4 | 0.0034 |
| 1.5 | 0.0043 |
| 1.6 | 0.0055 |
| 1.7 | 0.007 |
| 1.8 | 0.0089 |
| 1.9 | 0.0113 |
| 2 | 0.0144 |
| 2.1 | 0.0183 |
| 2.2 | 0.0233 |
| 2.3 | 0.0297 |
| 2.4 | 0.0377 |
| 2.5 | 0.0481 |

Thus, the micromonitoring device 1 is able to accurately measure a wide range of flow rates Q, from very low to very high. Compared to known primary devices which make large obstructions in order to calculate flow rate Q using that primary device's specific rating curve, the micromonitoring device 1 uses at least the two methods of calculating flow rate 79, 80 as shown in FIG. 10 and described above. This allows the micromonitoring device 1 to use a short micromonitoring weir 3 in order to help prevent clogging or ragging.

As opposed to other primary devices used in measuring flow rates, the ability of the micromonitoring device 1 to measure both low and high flow rates accurately allows it to effectively assist in identifying upstream I/I even during small precipitation events.

Figure 11:
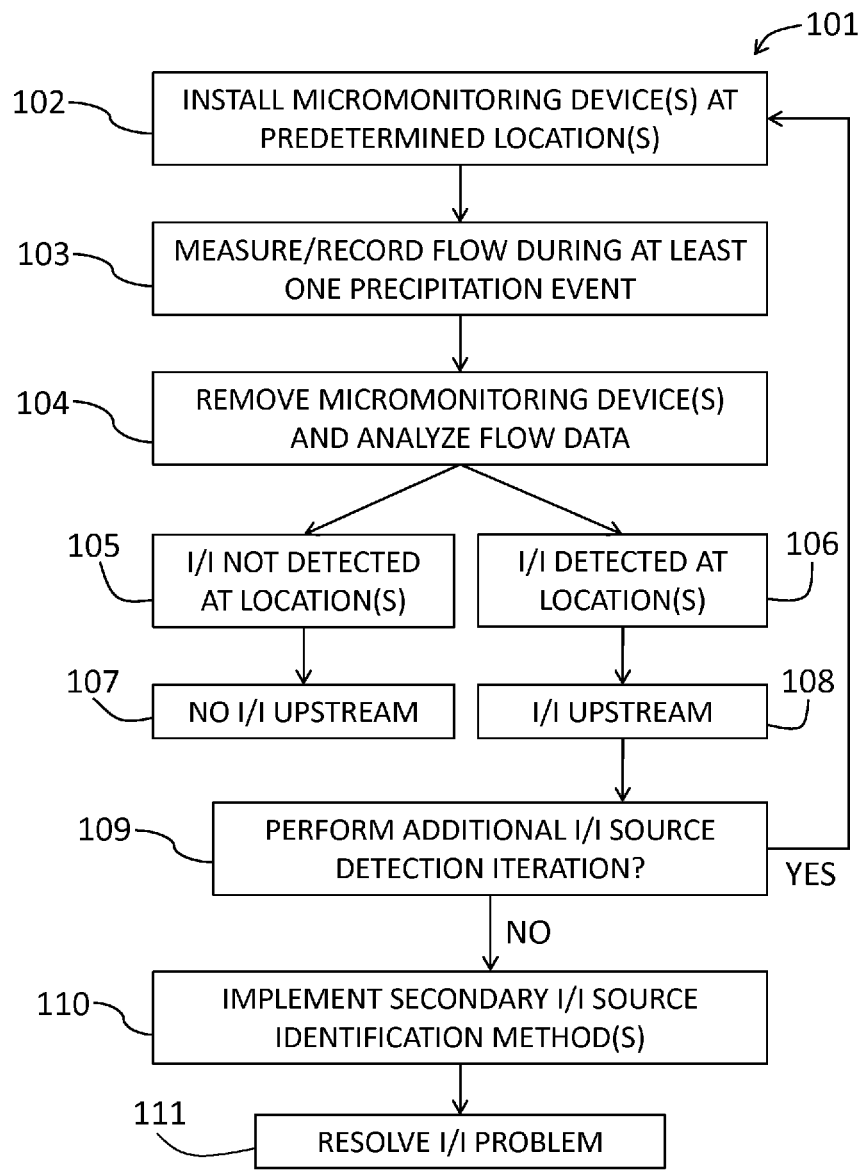
FIG. 11 is a schematic block diagram of one embodiment of a micromonitoring method according to one aspect of the present invention.

Turning to FIG. 11, another aspect of the present invention relates to a micromonitoring method 101 for identifying I/I. Generally, the micromonitoring method 101 entails at least one iteration of measuring and analyzing the flow rate Q of wastewater during at least one precipitation event at predetermined location(s) within a sewer system. The flow rate Q analysis during at least one precipitation event provides useful information for determining whether there is I/I upstream from the monitored location(s). After determining if I/I is detected at the location(s), further iterations could be performed to hone in on the I/I source.

The first step in the micromonitoring method 101 is to install at least one micromonitoring device 1 at a predetermined location(s) within a sewer system 102. The location(s) to monitor can be chosen based on a variety of factors, such as the overall layout of sewer system, the costs involved, and the initial information about I/I. After the micromonitoring device(s) 1 is installed at the predetermined location(s), the device(s) is left in the sewer pipe for at least one precipitation event 103. A precipitation event could consist of, e.g., a rainstorm or a snow melt event. During the precipitation event(s), the micromonitoring device(s) 1 measures and records the depth and velocity of the wastewater 103 at that location(s). The flow rate is either simultaneously calculated in the data logger 5 based on the calculations described above 79, 80 for determining flow rate, or calculated after the depth and velocity are retrieved from the data logger.

The next step is to analyze the flow rate data at that monitored location 104. Typically, the micromonitoring device 1 is removed and the data is retrieved to be analyzed; however, if the flow data is transmitted by the micromonitoring device 1, then removal is not necessary in order to obtain the data. If the sewer system is having an I/I problem, the micromonitoring device 1 is left in the sewer pipe until at least one precipitation event causes a significant increase in I/I within the sewer system. As a result, if there is a significant increase in flow rate during the at least one precipitation event, then I/I is detected at the location(s) 106 and there is I/I upstream 108 from that location(s). Conversely, if there is not a significant increase in flow rate during at least one precipitation event, then I/I is not detected at the location(s) 105 and there is little or no I/I upstream 107 from that location(s).

Knowing whether or not there is I/I upstream at a certain location(s) is useful information for how to next proceed in micromonitoring method 101. If there is I/I detected at the location(s) 106, and thus there is I/I upstream 108, then an additional micromonitoring iteration could be performed to further hone in on the I/I source. Each additional iteration would consist of moving the at least one micromonitoring device 1 upstream from the previously location where I/I was detected. Each iteration helps to identify sections of the sewer system where I/I is and is not a problem. This allows for a much more efficient approach to resolving the I/I problem, because it provides focus for how and where to proceed with resolving the I/I problem.

After at least one micromonitoring iteration, secondary I/I source identification methods 110 may be implemented in the piping sections where I/I was identified. These secondary identification methods include visual inspections, closed circuit television ("CCTV"), smoke and dye testing, and other techniques known in the field. After all the identification has been completed, typically the I/I problems will be resolved I/I depending on the specifics of the I/I source. For example, if a crack in a sewer pipe is found, then the pipe may be patched. Consequently, the micromonitoring method 101 to help identify specific sources provides substantial cost and efficiency benefits to the ultimate resolutions of the problems.

FIGS. 12-15 show a specific application of the micromonitoring method 101 as applied to a particular basin within the sewer system of a community. FIG. 12A shows an overhead layout of the community 131 with the pipes that flow to basin 071. The sewer pipes in basin 071 have been highlighted to make them more visible. An I/I problem was identified at basin 071 and in order to resolve the I/I problem, the micromonitoring method 101 was implemented to help identify where to focus the identification efforts. The intent behind determining where to focus was to limit the more costly and typically more invasive secondary I/I source identification methods to a very limited area in order to hone in on the specific I/I source(s).

Figure 12A:
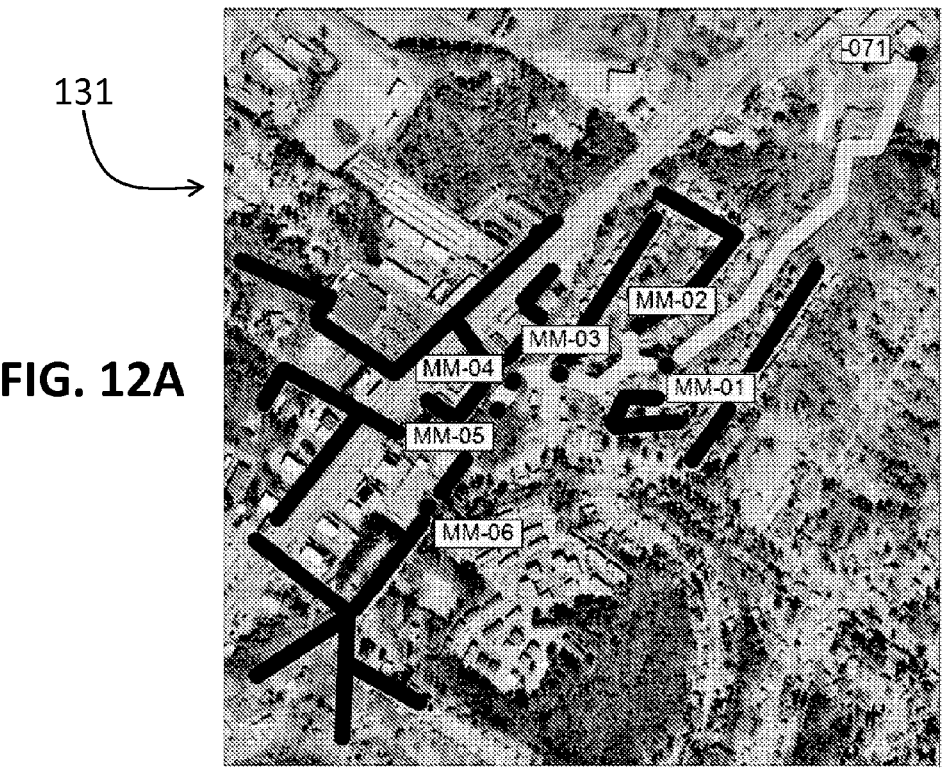
FIG. 12A is an overhead view of basin 071 within a community depicting the locations of installed micromonitoring devices.
Figure 12B:
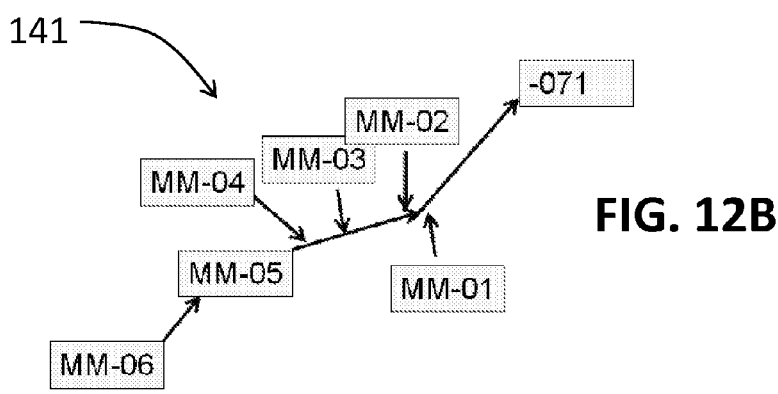
FIG. 12B is a graphic showing the flow path of wastewater within the basin 071 shown in FIG. 12A.

As shown in FIGS. 12A and 12B, six micromonitoring devices 1 were installed at the six sub-basin locations indicated by black dots MM-01, MM-02, MM-03, MM-04, MM-05, MM-06. One regular regional flow meter was installed at the downstream location 071 to capture the overall flow in the basin. FIG. 12B shows the flow paths of wastewater 141 within the sewer system of basin 071. Accordingly, the predetermined monitoring locations were chosen based on the flow paths 141 in order to help determine what portions of the pipe were contributing to the I/I experienced at basin 071.

Figure 13:
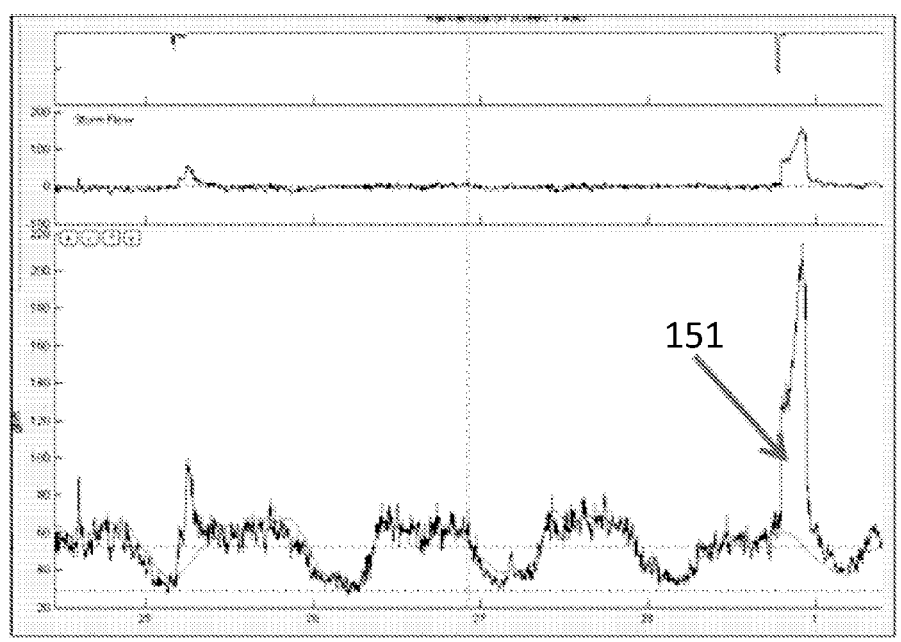
FIG. 13 is a chart depicting measured flow rate over time for basin 071.
Figure 14:
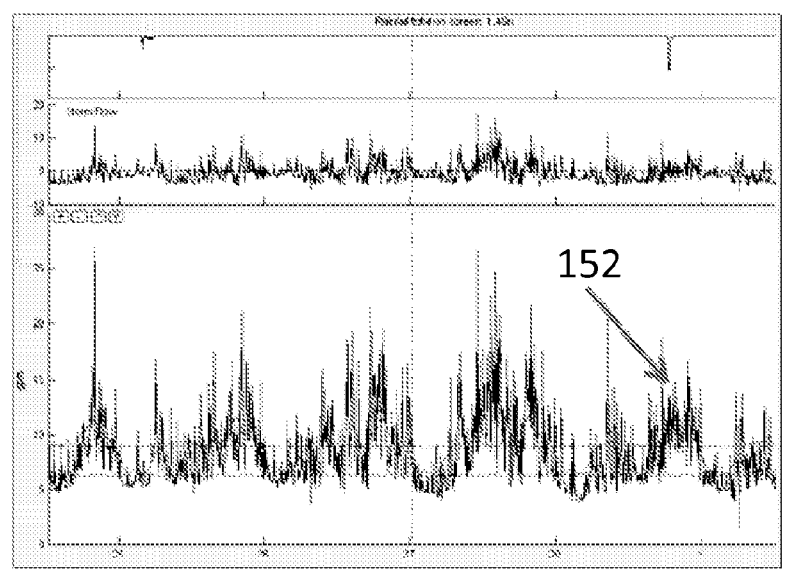
FIG. 14 is a chart depicting measured flow rate over time for micromonitoring location MM-03.
Figure 15:
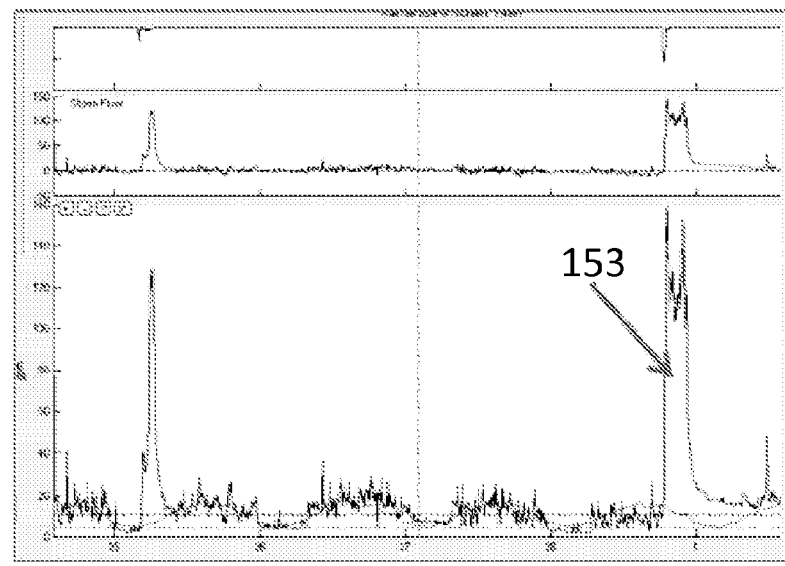
FIG. 15 is a chart depicting measured flow rate over time for micromonitoring location MM-06.

Micromonitoring devices 1 were installed at the six locations and were left there to record the flow rate of the wastewater 12 moving past each respective location. The micromonitoring devices 1 were left in for two precipitation events, a minor rainstorm event on February 25 and a major rainstorm event on February 28, and then were removed shortly after the event in order to obtain the measurement data. FIGS. 13-15 show the flow rate Q results in gpm over time from the downstream 071 location, the MM-03 location, and the MM-06 location, respectively.

As shown in FIG. 13, the regional flow meter at location 071 measured significant flow rate Q increases during the February 28 major rainstorm event, as indicated by arrow 151. The flow rate substantially increased due to the I/I upstream from location 071. The I/I and substantial increase in flow rate during the major rainstorm event not only contributed to the stress put on the sewer system and the piping structures, but also added to the overall amount of wastewater that basin 071 had to manage.

The results of one iteration of the micromonitoring method 101 applied to basin 071 showed that sub-basin location MM-06 accounted for almost all of the I/I recorded at the regional downstream monitor at location 071. As shown in FIG. 14, the flow rate Q results over time for sub-basin location MM-03, there was essentially no response to the major rainstorm event on the 28th, as indicated by arrow 152. Contrastingly, as shown in FIG. 15, the flow rate Q results over time for sub-basin location MM-06, the measured flow closely approximated the flow at the regional downstream flow monitor 071, as indicated by arrow 153.

In this specific example, sub-basin MM-06 accounted for only about 18% of basin 071. Sub-basins MM-02 and MM-04 (about 22% of the entire basin) showed some measurable I/I, which could warrant further investigation. However, the remaining sub-basins, about 60% of basin 071, did not show any measurable I/I and thus eliminated the need for secondary identification methods for at least 60% of basin 071, resulting in significant savings in cost and effort. Also, additional monitoring iterations 109 could have been performed to further reduce the length of pipe requiring secondary inspection methods to be performed on them and to further hone in on the specific I/I source(s).

Since certain changes may be made in the above described micromonitoring device and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A method of measuring flow characteristics in a sewer pipe, comprising:
   providing a micromonitoring apparatus in a sewer pipe at a measuring location, the micromonitoring apparatus comprising:
      a weir that includes a low point having a height and one or more and lateral portions that lie lateral to the low point and that are higher than the height, the weir preventing wastewater that lies below the low point from passing downstream in the sewer pipe;
      a ramp having an upstream portion that conforms to an interior of the sewer pipe, the ramp extending downstream from the upstream portion to the low point of the weir and shaped to direct at least portions of the flow of wastewater toward and over the low point of the weir; and
      a sensing probe;
   inserting the micromonitoring apparatus into the sewer pipe;
   measuring flow characteristics with the sensing probe, wherein measuring flow characteristics includes measuring flow characteristics of wastewater within the sewer pipe; and
   recording the measurements of the wastewater characteristics.

2. The method of claim 1, wherein inserting the micromonitoring apparatus into the sewer pipe includes inserting the micromonitoring apparatus from a ground level surface.

3. The method of claim 2, wherein measuring flow characteristics includes measuring flow characteristics of wastewater within the sewer pipe for at least one precipitation event.

4. The method of claim 3, further comprising:
   analyzing the measured characteristics to determine whether there is one of inflow and infiltration upstream from the measuring location.

5. The method of claim 4, further comprising:
   performing one or more additional iterations of inserting the micromonitoring apparatus, measuring flow characteristics of wastewater, recording the measurements, and analyzing the measured characteristics in order to further identify an upstream source of one of inflow and infiltration.

6. The method of claim 5, further comprising:
   performing a secondary identification method to more specifically identify the upstream source of one of inflow and infiltration.

7. The method of claim 1, wherein the flow characteristics include wastewater level and wastewater velocity.

8. The method of claim 1, further comprising:
   calculating the flow rate of the wastewater using the wastewater level measurements in a rating curve associated with the weir when a level measurement is below a threshold wastewater depth.

9. The method of claim 8, further comprising:
   calculating a flow rate of the wastewater using the wastewater level and wastewater velocity measurements in a continuity equation associated with the weir when the level measurement is above a threshold wastewater depth.

10. The method of claim 1, wherein the low point of the micromonitoring apparatus that is inserted lies generally along a vertical centerline of the sewer pipe, taken in a direction parallel to the flow of wastewater through the sewer pipe, and wherein the one or more lateral portions include a lateral portion on each lateral side of the low point.

11. The method of claim 10, wherein the low point of the micromonitoring apparatus that is inserted includes a circular-type shape that lies between the lateral portions.

12. The method of claim 11, wherein the lateral portions of the micromonitoring apparatus that is inserted extend upward from the circular-type shape of the low point of the weir to form a saddle-type shape.

13. The method of claim 11, wherein the height of the low point of the weir is less than one-tenth of a diameter of a wastewater passageway to which the upstream edge is constructed to conform.

14. The method of claim 10, wherein the ramp of the micromonitoring apparatus that is inserted has an upstream edge that approaches zero to match a slope of the lower interior portion of the wastewater passageway.

15. The method of claim 10, wherein the ramp of the micromonitoring apparatus that is inserted is shaped with a depression that lies along at least portions of the ramp to direct the flow of wastewater and debris toward the vertical centerline of the wastewater passageway as the flow of wastewater is directed toward and over the low point of the weir.

16. The method of claim 10, wherein measuring flow characteristics with the sensing probe includes measuring flow characteristics upstream of the low point with the sensing probe.

17. The method of claim 10, further comprising:
logging data with a data logger connected to the said sensing probe.

* * * * *